United States Patent
Syed et al.

(10) Patent No.: US 7,680,567 B2
(45) Date of Patent: Mar. 16, 2010

(54) METHOD FOR REDUCING DRIVELINE VIBRATION IN A HYBRID ELECTRIC VEHICLE POWERTRAIN

(75) Inventors: Fazal Syed, Canton, MI (US); Ming Kuang, Canton, MI (US); John Czubay, Troy, MI (US); Paul Niessen, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1264 days.

(21) Appl. No.: 11/161,349

(22) Filed: Jul. 29, 2005

(65) Prior Publication Data

US 2006/0025906 A1    Feb. 2, 2006

Related U.S. Application Data

(60) Provisional application No. 60/592,199, filed on Jul. 29, 2004.

(51) Int. Cl.
*G06F 17/00* (2006.01)

(52) U.S. Cl. .................................................. 701/22

(58) Field of Classification Search ................ 701/22
See application file for complete search history.

(56) References Cited

U.S. PATENT DOCUMENTS

| | | | |
|---|---|---|---|
| 6,104,976 A | 8/2000 | Nakamura | |
| 6,193,628 B1 | 2/2001 | Hrovat et al. | |
| 6,286,473 B1 | 9/2001 | Zaremba | |
| 6,565,479 B2 | 5/2003 | Fattic et al. | |
| 6,629,025 B2 | 9/2003 | Evans et al. | |
| 6,629,026 B1 | 9/2003 | Baraszu et al. | |
| 6,991,053 B2 * | 1/2006 | Kuang et al. | 180/65.2 |
| 7,285,869 B2 * | 10/2007 | Syed et al. | 290/40 C |
| 7,292,917 B2 * | 11/2007 | Kuang et al. | 701/22 |

* cited by examiner

*Primary Examiner*—Yonel Beaulieu
(74) *Attorney, Agent, or Firm*—David B. Kelley; Brooks Kushman P.C.

(57) ABSTRACT

A method is disclosed for managing torque distribution in a hybrid electric vehicle powertrain. An engine power estimation is determined for use in obtaining an optimum wheel torque command to attenuate sustained powertrain dynamic oscillations during operation of the vehicle with varying wheel torque and speed.

13 Claims, 5 Drawing Sheets

METHOD FOR REDUCING DRIVELINE VIBRATION IN A HYBRID ELECTRIC VEHICLE POWERTRAIN

CROSS-REFERENCE TO RELATED APPLICATIONS

This application claims the benefit of U.S. provisional application Ser. No. 60/592,199 filed Jul. 29, 2004.

BACKGROUND OF THE INVENTION

1. Field of the Invention

The invention relates to management of driving power in a hybrid electric vehicle having two power sources whereby vehicle driveline vibration oscillations are attenuated.

2. Background Discussion

Powertrain configurations for hybrid electric vehicles have multiple power sources. A primary power source typically is an internal combustion engine, although other power sources, such as a fuel cell, can be used instead. A secondary power source would include an electric motor, such as an induction motor electrically coupled to a high voltage battery and an electric generator.

A hybrid electric powertrain may include a configuration in which multiple power sources distribute power to vehicle traction wheels through gearing of a transmission that defines divided power flow paths. The battery acts as an energy storing device for the generator and the motor as power is distributed through the divided power flow paths. The motor and the generator can be referred to as electric machines since either is capable of acting as a motor under certain driving conditions and as a generator under other driving conditions.

A vehicle system controller will maintain the vehicle at its maximum performance value by managing the power distribution among the various components of the vehicle powertrain. It manages the operating state of the engine, the generator, the motor and the battery to maximize total vehicle efficiency. The battery is an energy storage medium for the generator and the motor.

The vehicle system controller will ensure that power management for optimum vehicle performance and drivability is maintained as it commands desired engine torque and interfaces with a transmission control module. The transmission control module commands a motor torque to effect the commanded wheel torque. It also commands a generator torque to control the engine to achieve a desired engine speed.

For the purpose of disclosing the present invention, reference will be made to a so-called series-parallel powertrain configuration, although the invention is not limited to use in a powertrain configuration of that type. In a series-parallel powertrain configuration, a motor torque control must coordinate the wheel torque command and the generator torque command. It then must compensate for the inertia effect of the generator and the gearing elements to which the generator is connected. This will ensure that the vehicle system controller wheel torque command is fulfilled.

Environmental disturbances and powertrain dynamic interactions of the engine, generator and motor can result in oscillatory generator torque. An oscillatory generator torque can result in an oscillatory motor torque command, which can excite driveline torque oscillations. In turn, these driveline torque oscillations can result in oscillatory generator target speeds and actual generator speeds, which will cause oscillatory generator torque commands. A controlled coordination of the torque of the motor and the generator can potentially result in a so-called "positive feedback" control loop if the control system is not implemented properly. This positive feedback can cause driveline torque oscillations to be sustained.

Engine power available at the traction wheels needs to be estimated in order to afford the vehicle operator with maximum powertrain system capability under all engine and battery operating conditions without violating battery power limits. This engine power estimation is used to determine an appropriate maximum wheel power command, which is used to determine an optimum maximum desired wheel torque for a given set of operating conditions. When maximum powertrain system capability is demanded (e.g., in a full acceleration pedal startup, or at accelerator pedal commands with low battery limits), the engine power estimation directly affects the wheel power command and also the wheel torque command.

An implementation of an engine power estimation is done without exceeding allowable power limits as described in patent application Ser. No. 10/248,886, filed Feb. 27, 2003, entitled "Closed-Loop Power Control System For Hybrid Electric Vehicles", now U.S. Pat. No. 6,991,053, issued Jan. 31, 2006. That patent application is assigned to the assignee of the present invention.

The engine power estimation is based on the difference between the commanded wheel power and the sum of the commanded motor power and the commanded generator power. Assuming that the transmission is delivering the commanded wheel power and wheel torque, the motor and generator torque commands can be oscillatory, as previously indicated, which may result in oscillatory motor and generator power values. This in turn may cause the engine power estimation to oscillate. This oscillatory engine power estimation can cause oscillatory wheel power commands, which would result in oscillatory wheel torque commands. Oscillatory wheel torque commands can amplify the driveline oscillations induced by the so-called "positive feedback" in the motor and generator coordination control.

Engine power can be estimated as disclosed in U.S. patent application Ser. No. 11/161,344, filed Jul. 29, 2005, which is entitled "Method for Estimating Engine Power in a Hybrid Electric Vehicle Powertrain", now U.S. Pat. No. 7,285,869, issued Oct. 23, 2007. That application is assigned to the assignee of the present invention. Such engine power estimation actually is analogous to a coupling between the powertrain control module and the transmission control module, which can sustain driveline oscillations initiated by the transmission. These driveline oscillations are more noticeable during full accelerator pedal launches under low vehicle speeds and under operating conditions when battery power limits are low. They are less noticeable at relatively high vehicle speeds.

SUMMARY OF THE INVENTION

In a powertrain controller of the kind disclosed in the patent application previously identified, an engine power estimate is made by a vehicle system controller and a transmission control module whose functions are interactive so that an engine power estimate is obtained with a so-called coupling of the transmission control module and vehicle system controller functions. This can result in sustained driveline oscillations due to the fact that the speed of the motor will fluctuate. This partly is caused by the low damping characteristics of the hybrid electric vehicle powertrain, which lacks a hydrokinetic torque converter. It is caused also by the torsional spring effect of the torque delivery driveshafts extending from the transmission to the vehicle traction wheel and axle assembly.

Because the motor speed can have an oscillatory characteristic in a hybrid vehicle powertrain configuration, the estimated engine power that is calculated using a control routine of the kind disclosed in the patent application may oscillate the speed of the motor, as well as other variables including the motor torque command. The generator speed, the generator torque command, and the wheel torque command are functionally related to estimated engine torque.

In practicing the method of the invention, a desired vehicle wheel speed and torque are determined in response to a demand by the vehicle driver. A generator torque command is determined as a function of the engine speed command and a motor torque command is determined as a function of desired wheel torque and generator torque commands. A raw estimate of engine power then is calculated as a function of operating variables including desired wheel torque, the motor torque command and the generator torque command.

The raw engine power estimate is filtered using a filter with a band stop filter characteristic or a low pass filter characteristic to ensure a decoupling between the powertrain control module and the transmission control module. The power estimate then is weighted between a band stop filtered value and the raw engine power estimate value to achieve engine power estimate accuracy at a given instant in the current control loop of the vehicle system controller. A weighted filter factor and a filter time lag characteristic are used in the weighting procedure. In this way, oscillatory disturbances in the powertrain are attenuated. The magnitude of the filter factor is dependant on motor speed.

DETAILED DESCRIPTION OF AN EMBODIMENT OF THE INVENTION

Figure 1:
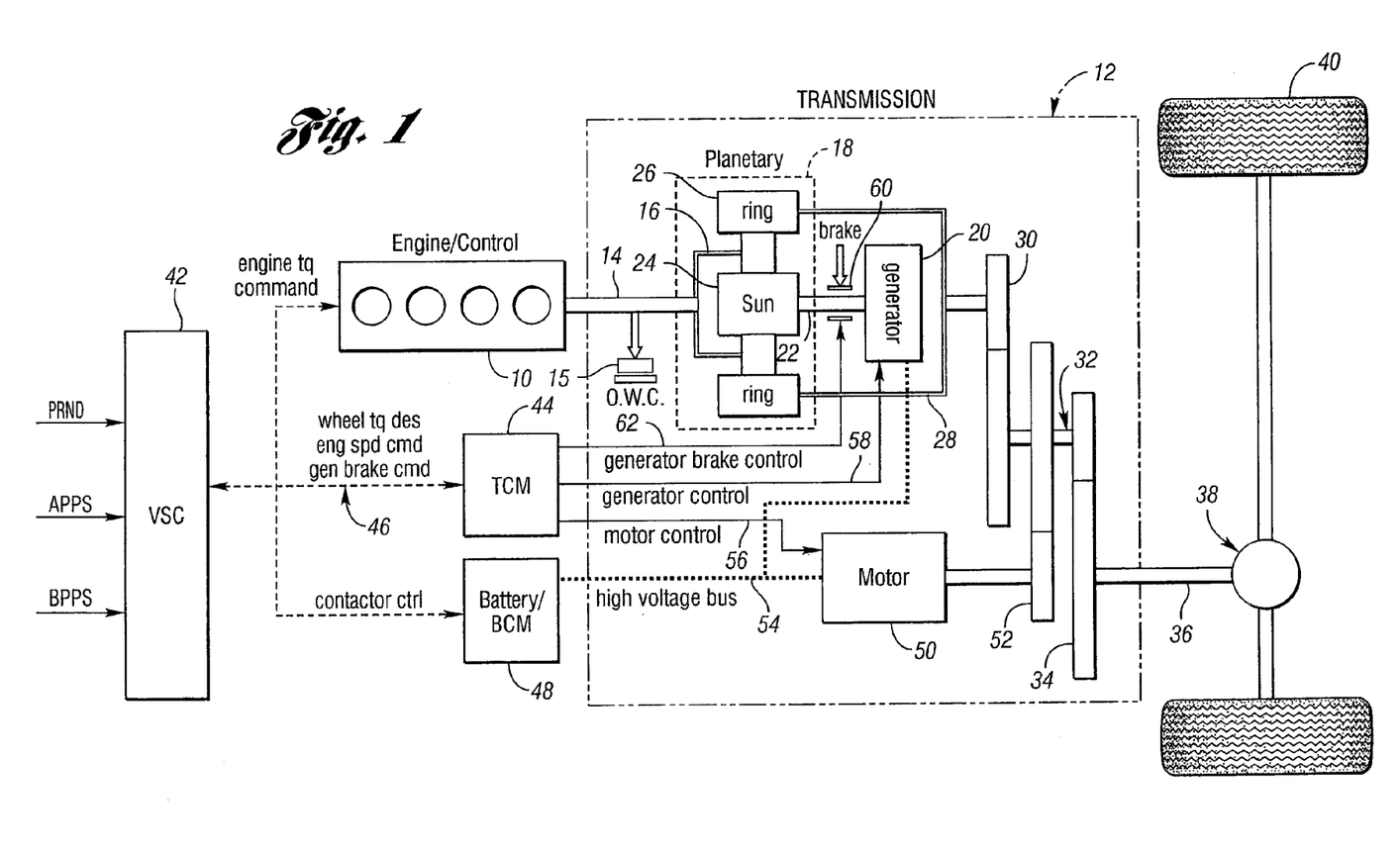
FIG. 1 is a schematic system diagram of a hybrid electric vehicle powertrain having a series power flow path and a parallel power flow path for distributing power to vehicle traction wheels, together with a vehicle system controller that is decoupled from a transmission control module in accordance with the control strategy of the present invention.

FIG. 1 is a schematic diagram of a series-parallel hybrid electric vehicle powertrain. Although other powertrain configurations could be used in practicing the present invention, the powertrain configuration of FIG. 1 will be described as one example of a powertrain system capable of carrying out the control functions of the invention.

The configuration of FIG. 1 includes an internal combustion engine 10 and a power transmission 12. The engine crankshaft of the engine 10, which would correspond to the transmission torque input shaft 14, is connected drivably to the carrier 16 of a planetary gear unit 18. An electric generator 20, which, as mentioned previously, may act as a motor under certain operating conditions, is connected mechanically by shaft 22 to sun gear 24 of planetary gear unit 18. Carrier 16 rotatably supports pinions that engage sun gear 24 and planetary ring gear 26.

A torque transmitting element 28 transfers ring gear torque to torque input element 30 of countershaft gearing 32. An output gear element 34 of the countershaft gearing 32 is connected drivably, as shown at 36, to a differential and axle assembly generally indicated at 38, whereby torque is transferred to vehicle traction wheels 40.

A vehicle system controller (VSC) 42 is electrically coupled to a transmission control module (TCM) 44 and to a controller for engine 10. Command signals are distributed by the vehicle system controller through signal flow paths generally indicated at 46 to the engine controller. Signal flow paths 46 provide signal communication also between the vehicle system controller 42 and the transmission control module 44. A battery and battery control module (BCM) 48 is electrically coupled through signal flow paths 46 to the vehicle system controller 42.

The generator 20 is electrically coupled to electric motor 50. The rotor of motor 50 is mechanically connected to motor torque input gear 52 for the countershaft gearing 32. The electrical coupling between the generator 20 and the motor is provided by a high voltage bus 54, powered by the battery and battery control module 48.

The transmission control module is in communication with the motor 50 through motor control signal flow path 56. The generator communicates with the transmission control module through signal flow path 58. A generator brake, which is indicated at 60, is electrically connected to the transmission control module through signal flow path 62.

When brake 60 is applied, engine power is transmitted through a single, fully-mechanical torque flow path from the engine, through the planetary gear unit 18 and through the countershaft gearing 32 to the traction wheel-and-axle assembly.

During normal hybrid electric powertrain operation, the brake 60 would be released and the generator 20 would apply reaction torque to the sun gear, thereby establishing parallel power flow paths from the engine to the differential-and-axle assembly and from the motor generator subsystem through the countershaft gear assembly 32 to the wheel-and-axle assembly.

The powertrain system schematically illustrated in FIG. 1 may rely upon a fully electric motor drive or upon both motor and engine power to achieve maximum efficiency. The system of FIG. 1 may generate electrical power while driving the vehicle using generator power output. The vehicle system controller will maintain the vehicle at its maximum performance value by managing the power distribution among the various components of the vehicle powertrain. It manages the operating state of the engine, the generator, the motor, and the battery to maximize total vehicle efficiency. The battery is an energy storage medium for the generator and the motor.

The vehicle system controller commands a desired engine torque as it interfaces with the transmission control module using a commanded wheel torque and a commanded engine speed. Based upon the commanded wheel torque and the commanded engine speed developed by the vehicle system controller, the transmission control module commands a motor torque to develop the commanded wheel torque. The transmission control module also commands a generator torque to control the engine speed at a desired engine speed value.

Figure 2:
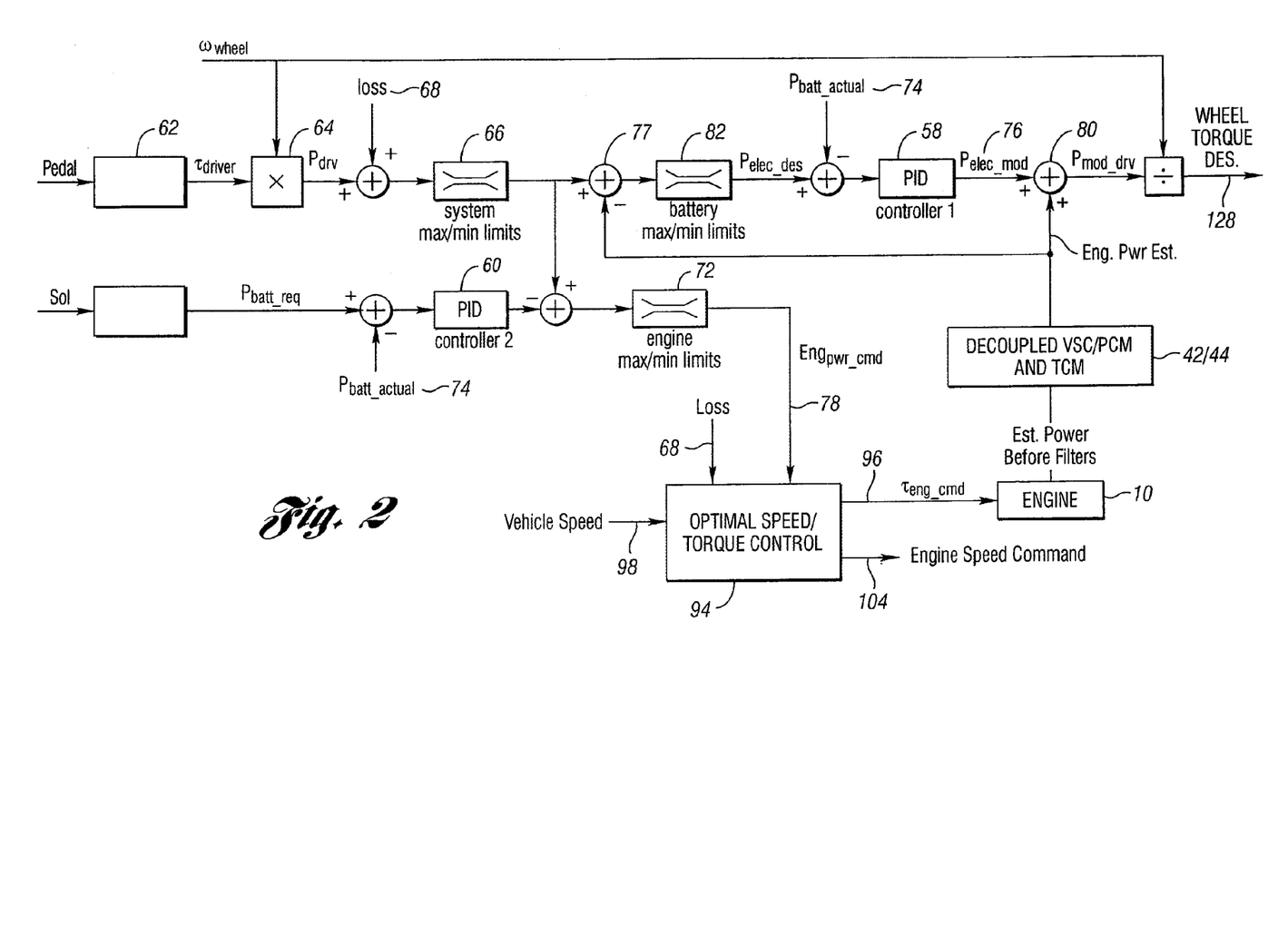
FIG. 2 is a control circuit for computing wheel torque in a series-parallel hybrid electric powertrain of the kind discussed in the preceding description, which includes the present invention.

FIG. 2 shows a schematic system diagram of the components of the vehicle system controller for developing an estimated engine power output without violating precalibrated maximum and minimum battery power limits and without violating calibrated maximum and minimum engine power limits.

As previously indicated, the two power sources are integrated so that they seamlessly work together to meet the driver's demand for power without exceeding the system's power limits, including battery limits, while maintaining optimum powertrain efficiency and performance. The system will determine a driver's demand for torque and achieve an optimum split of power between the two power sources. If the battery limits are exceeded and the battery voltage is outside of a specified range, powertrain system shutdown may occur. In order to avoid this condition without limiting the maximum vehicle performance, the control system coordinates the two power sources using a closed-loop power control. A closed-loop power control ensures a proper coordination between the two power sources.

FIG. 2 is a block diagram of a closed-loop powertrain control system. It properly distributes a total power request, which is the sum of the driver demand and the battery discharge and charge power requests to the two power sources.

FIG. 2 includes a first PID controller 58, which is a closed-loop controller that prevents actual battery power from exceeding defined limits. A second PID controller 60, using actual battery power as a feedback variable, ensures that the battery is being charged or discharged as intended by adjusting the engine power command.

The control system shown in FIG. 2 calculates the driver power demand ($P_{drv}$) based on the driver torque demand and wheel speed $\omega_{wheel}$. The driver torque demand, $T_{driver}$, is derived from accelerator pedal position using transducer 62. The wheel speed is obtained by a wheel speed sensor. The product of the wheel speed and the driver torque demand determines the driver power demand $P_{drv}$, as shown at 64.

Losses, $P_{loss}$, are powertrain losses, which comprise gearing losses and other mechanical loses as well as motor and generator electrical losses. After the losses are accounted for at 68 and the maximum system limits are determined at 66 and the engine output power determined at 70 is combined at 77 with the net driver power demand, the control system determines whether the battery power desired ($P_{elec\_des}$) is within the battery limits. The engine power command is tested at 72 to determine whether it is within engine capability.

The actual battery power ($P_{batt\_actual}$) at 74 is used as a feedback variable for controller 58 to ensure, by determining modified battery power desired ($P_{elec\_mod}$), as shown at 76, that the actual battery power satisfies battery power desired ($P_{elec\_des}$). Therefore, the actual battery power does not exceed battery limits.

The control system algebraically adds the values $P_{elec\_mod}$ and ENG PWR EST, to determine the allowed driver demand $P_{mod\_drv}$. This sum will ensure that the maximum system capability is achieved without violating battery limits.

The control system calculates desired wheel torque, which is the driver torque command as limited to the system limits.

The second PID controller 60, as explained previously, adjusts the engine power command to ensure that the battery power request $P_{batt\_req}$ for an optimal energy management strategy is achieved.

The first controller 58 may have a faster response than the second controller 60 to ensure control system stability.

If it is assumed, for example, that in a steady-state operating mode a driver requests 50 kw of power, after accounting for the electrical losses at 68, and that the engine power estimate output is 50 kw, the battery power desired ($P_{elect\_des}$) will be zero. The battery power desired ($P_{elect\_des}$) is the difference between the value at comparator 66 and the engine estimated output power. Depending upon whether the electrical loss estimate is equal to the actual electrical loss, it is possible, within steady-state operating conditions, that the output of controller 58 will be zero. This would cause the power at summing point 80 in FIG. 3 to be 50 KW.

If, for example, the driver requests a change from a power level of 50 kw to a power level of 70 kw after accounting for losses, and the engine limit is 50 kw, the battery will be called upon to supply 20 kw. If actual battery power at 74 is close to the battery power desired as limited by the comparator at 82, the value for $P_{elec\_mod}$ at 76 will be equal to or less than 20. The engine power estimate and $P_{elec\_mod}$ are summed at 80 to produce, together with wheel speed ($\omega_{wheel}$), the desired wheel torque at 128.

If the actual battery power at 74 exceeds the battery power demand permitted by the comparator 82, the value for $P_{elec\_mod}$ at 76 will be reduced at comparator 82 so that the value for $P_{mod\_drv}$ at 80 will be smaller, thereby ensuring that the battery power optimal energy management strategy is satisfied.

Figure 3:
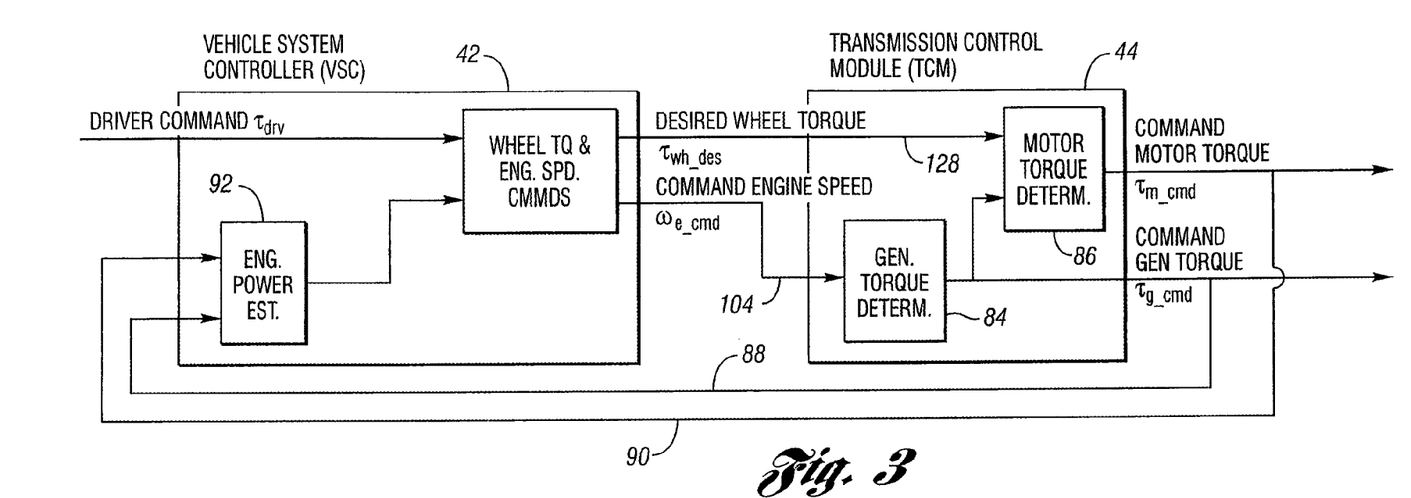
FIG. 3 is a simplified block diagram, wherein the transmission control module and the vehicle system controller have decoupled control functions.

FIG. 3 shows a simplified block diagram of a control system for a series-parallel hybrid electric vehicle powertrain of the kind illustrated in FIG. 1. Due to the characteristics of a series-parallel powertrain configuration of this type, the motor torque control must be coordinated in a closed-loop fashion with the generator torque command and must take into account and compensate for the inertia effect of the generator and the sun gear assembly, shown at 20 and 24 in FIG. 1. This will ensure that the vehicle system controller wheel torque command is fulfilled. This closed-loop control is seen in FIG. 3 where the generator torque command is determined by the transmission control module 44 at subsystem 84. Motor torque is determined by the transmission control module 44 at subsystem 86. Both the commanded motor torque and the commanded generator torque are distributed through signal feedback paths 88 and 90, respectively, to the vehicle system controller 42, where engine power is estimated at subsystem 92. This power estimation is carried out by an algorithm as follows:

$$P_{eng\_est\_raw} = \left(\frac{T_{wh}}{K} - T_{mot}\right)\omega_{mot} - (T_{gen}\omega_g)$$

where $T_{mot}$ is motor torque,
$\omega_{mot}$ is motor speed,
$T_{gen}$ is generator torque,
$\omega_{gen}$ is generator speed, and
K is a fixed constant dependent on the gearing ratio between the motor and the wheels.

The engine power estimation calculation that occurs at subsystem 92 may be that which is described in patent application Ser. No. 11/161,344, filed Jul. 29, 2005, entitled "Method For Estimating Engine Power In A Hybrid Electric Vehicle Powertrain," which is assigned to the assignee of the present invention, now U.S. Pat. No. 7,285,869.

The estimated engine power, determined at 92, is distributed to a wheel torque and engine speed command calculation subsystem of the controller 42. The algorithm carried out at subsystem 92 is illustrated schematically in the block diagram of FIG. 4. In the engine power estimation technique of FIG. 4, the engine power estimation subsystem receives as input data the desired wheel torque, which is computed as described with reference to FIG. 2. It receives also a motor torque command, as shown at 90 in FIG. 3, and a generator torque command, as shown at 88 in FIG. 3. A motor speed, which can be derived from vehicle speed, and generator speed also are used as input variables.

An engine speed command is developed by subsystem 94, seen in FIG. 2. Subsystem 94 receives an engine power command, determined at 78 in FIG. 2, and a vehicle speed signal 98 and losses at 68. Using this input data, an engine speed command is determined at 104. The engine torque command is distributed to the engine to develop an engine estimated power, seen in FIG. 2. This is the value for the engine power estimate before it is filtered by a band stop filter, as will be explained subsequently with reference to FIGS. 5 and 6. The result of the filtering is an estimated engine power used to determine desired wheel torque.

Figure 4:
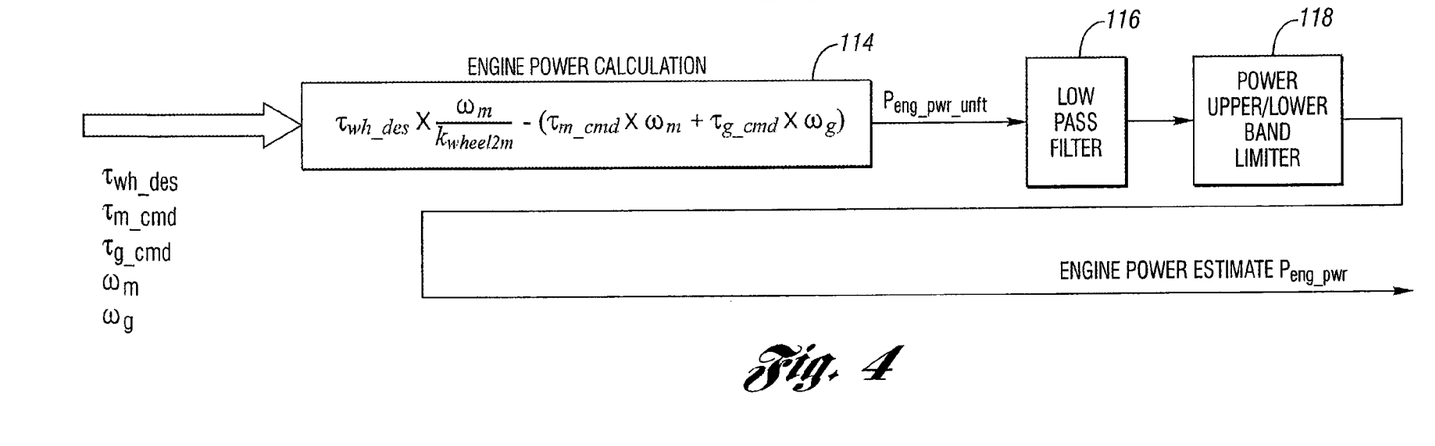
FIG. 4 is a generalized schematic block diagram of elements involved in an engine power estimate calculation for a control system architecture of the kind illustrated in FIG. 3.
Figure 5:
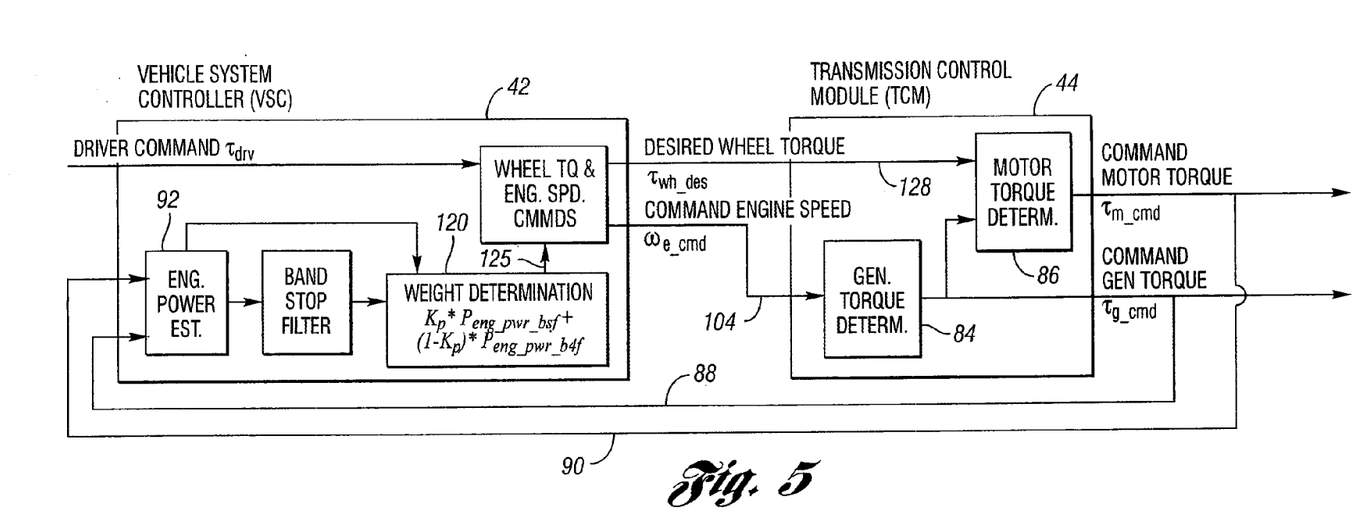
FIG. 5 is a generalized schematic block diagram of elements of a control system that embodies the present invention for obtaining a commanded motor torque and a commanded generator torque such that driveline oscillations are attenuated.
Figure 5A:
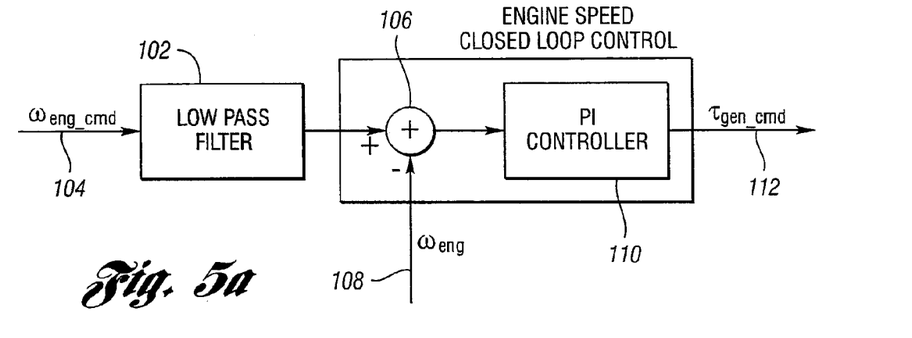
FIG. 5a is a schematic diagram of a closed loop controller for determining a generator torque command.

The commanded generator torque used in the engine power calculation of FIG. 4 is derived as shown in FIG. 5a, which illustrates an engine speed closed-loop control. It consists of a low pass filter 102, which receives an engine speed command, as shown at 104. The engine speed command after filtering is compared at 106 to measured engine speed at 108. A proportional-integral (PI) controller 110 is used to develop a generator torque command at 112.

Figure 5B:
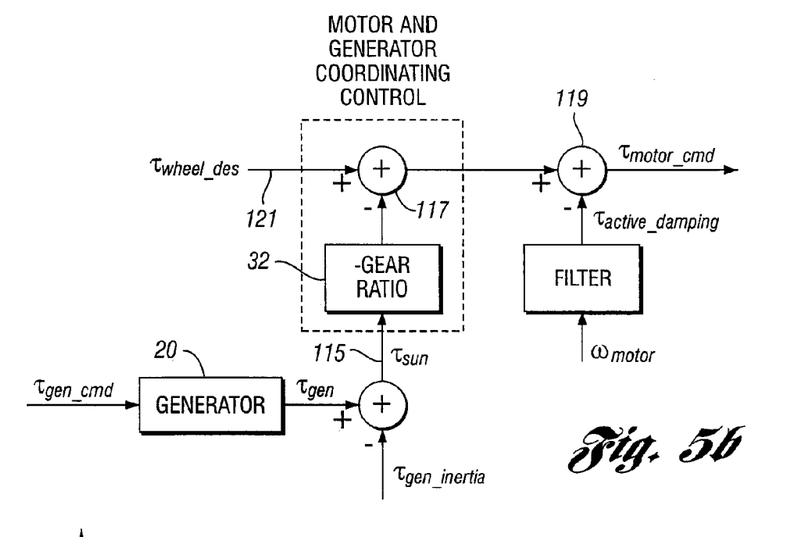
FIG. 5b is a schematic diagram of a controller for determining a motor torque command.

FIG. 5b schematically illustrates how a motor torque command ($\tau_{motor\_com}$) is determined. The driver wheel torque desired at 121 is coordinated by the gearing and summing point 117 with sun gear torque $\tau_{sun}$ at 115. An active damping torque is combined at 119 with the torque value at 117 to produce the motor torque command. The active damping torque is an output of a filter circuit using motor speed as an input, as indicated. This is needed to attenuate powertrain oscillations as described in U.S. patent application Ser. No. 11/161,101, filed Jul. 22, 2005, now U.S. Pat. No. 7,292,917, entitled "Method for Attenuating Vibrations in a Hybrid Electric Vehicle Powertrain," which is assigned to the assignee of the present invention.

The output of the calculation at 114, previously described in the discussion of FIG. 4, is an unfiltered engine power. A filtering circuit 116, seen in FIG. 4, eliminates extraneous engine power values for the unfiltered engine power value determined in the calculation at 114. The filtered engine power value then is distributed to a power upper and lower band limiter circuit 118, which protects the system against estimates of engine power that exceed precalibrated limits.

If there is an environmental disturbance in the engine/generator/motor/powertrain dynamic interactions, this can result in oscillatory generator torque, as previously explained. This can cause oscillatory generator target speed and actual generator speeds, which cause oscillatory generator torque commands.

In addition to the foregoing, engine power available to the wheels must be estimated in order to afford the driver with maximum powertrain system capability under any engine and battery condition without violating battery power limits. This engine power estimation is used to determine a proper maximum wheel power command, and then is used to determine an appropriate maximum wheel torque command for given conditions. When maximum powertrain system capability is demanded (e.g., in a full accelerator pedal tip-in or at certain accelerator pedal commands with low battery limits), the engine power estimation directly affects the wheel power command, as well as the wheel torque command.

The engine power estimation described with reference to FIGS. 3 and 4 can be considered to be a coupling between the vehicle system controller and the transmission control module that can sustain driveline oscillations initiated by the transmission control module and transaxle due to environmental disturbances. Such driveline oscillations are relatively more excitable during a full accelerator pedal launch under low vehicle speeds and low battery power limit conditions than during operation at relatively high vehicle speeds.

In order to reduce the possibility of developing sustained driveline oscillations due to a coupling of the engine power estimate developed by the vehicle system controller and the transmission control module, the control system of FIGS. 3 and 4 is decoupled. A decoupling feature is graphically illustrated in FIG. 6a.

Figure 6:
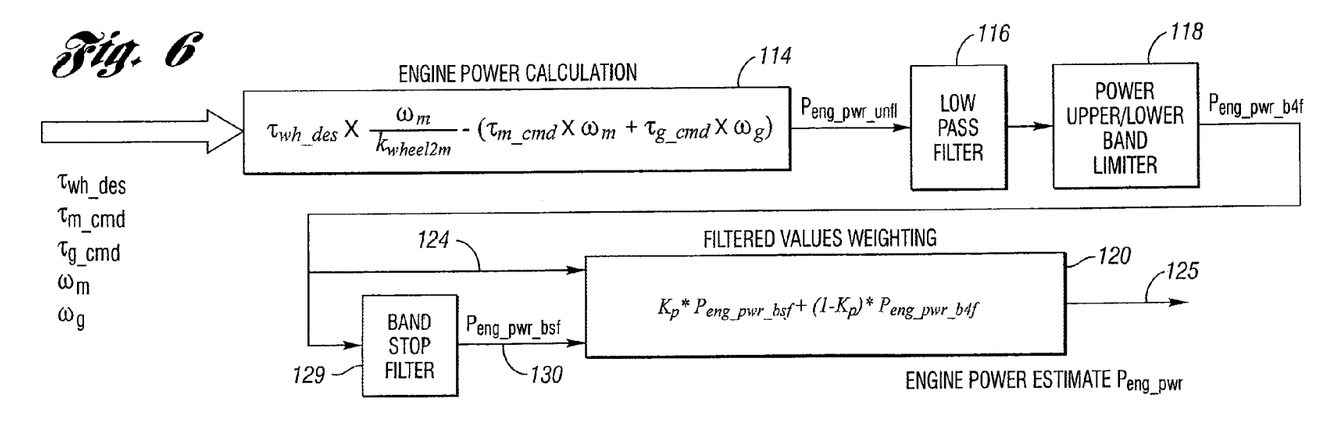
FIG. 6 is a generalized schematic block diagram of elements of the vehicle system controller involved in an engine power estimate for use in the system illustrated in FIG. 5.

The engine power estimate calculated at 92 is distributed, as shown in FIG. 5, to a weight determination subsystem 120. As indicated in FIG. 6, the engine power estimate is filtered before the weight determination is made at 120. This filtering is done initially by low pass filter 116 and power upper and lower band limiter 118. The engine power estimate before filtering at the output side of the limiter 118 is received directly by weight determination subsystem 120 through signal flow path 124. The portion of the engine power estimate that passes through signal flow path 124 is distributed directly through the weight determination subsystem 120 to the output signal flow path 125. As seen in FIG. 2, that engine power estimate is used, as previously explained, to produce a desired wheel torque value at 128 in FIG. 2.

The weighting of the filtered values, which occurs at 120, is carried out in accordance with the following algorithm:

$$K_p * P_{eng\_pwr\_bsf} + (1-K_p) * P_{eng\_pwr\_bf4},$$

where:
$P_{eng\_pwr\_bsf}$=band stop filtered engine power estimate, and
$P_{eng\_pwr\_b4f}$=engine power estimate before filtering.

The factor $K_p$ used in the execution of the algorithm at 120 is a weighting factor. This is a variable that depends upon vehicle speed. It could depend also upon motor speed, since vehicle speed is directly related to motor speed. At low motor speeds, the value for $K_p$ may be one, or unity. At high motor speeds, the value for $K_p$ can be reduced to near zero.

Figure 6A:
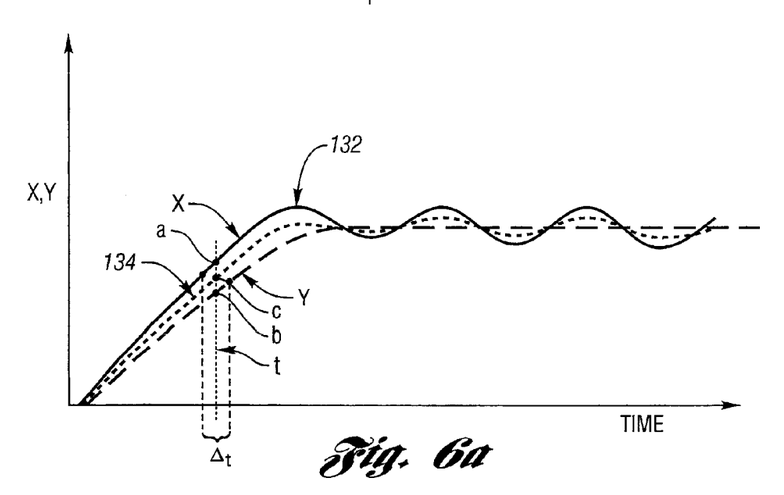
FIG. 6a is a time plot of band stop filter variables used in a calculation of an estimated engine power.

A band stop filter 129, which develops filter variable "Y," as will be explained with reference to FIG. 6a, is disposed between the power upper and lower band limiter 118 and the weight determination subsystem 120. It is characterized by a precise tuning. It is used to attenuate oscillations at a given frequency. An example of a filter of this type is described in U.S. Pat. No. 6,286,473.

The band stop filter 129 will establish a parallel engine power estimate signal flow path from the limiter subsystem 118 to the weight determination subsystem 120. The ratio of the magnitude of the signals in signal flow path 124 and signal flow path 130 at the output side of the band stop filter 129 depends upon the value of the weighting factor $K_p$, which in turn is dependent upon vehicle speed.

In the time plot of FIG. 6a, an example of band a stop filter variable Y and a raw engine power estimate X are plotted at 132. The X value, which is shown with a generalized frequency, shows the raw engine power estimate fluctuations at the output side of the power upper and lower band limiter subsystem 118. The filter variable Y is the output of the band stop filter 129, and has a non-fluctuating relationship with respect to time, as indicated in FIG. 6a. At any given instant "t", there will be a difference in the values of filter variables X and Y, as shown at points "a" and "b", respectively. The weighted value for the engine power estimate at 125 at time "t" would be "c", a modified value based on the values of "a" and "b" and the weighting factor $K_p$, shown on time plot 134 in FIG. 6a. There is a filter time lag ($\Delta_t$) between a point on the X plot and a point of equal value on the Y plot.

If $K_p$ is equal to one, which would occur at a low vehicle speed, the estimated power at 125 would be the same as the estimated power at 130. If the value for $K_p$ is small (i.e., near zero), a larger proportion of the signal at the output side of the power upper and lower band limiter 118 would pass through the signal flow path 124. The time plot at 134 in FIG. 6a demonstrates the effect of the time lag introduced in the signal flow path by band stop filter 129.

While the best mode for carrying out the invention has been described in detail, those familiar with the art to which this invention relates will recognize various alternative embodiments for practicing the invention. All such embodiments and equivalents thereof are intended to be defined by the following claims.

What is claimed is:

1. A method for attenuating dynamic oscillatory inertia torque disturbances in a powertrain for a hybrid electric vehicle, the powertrain having a first power source comprising an engine, a second power source comprising an electric motor electrically coupled to a battery and a generator, and gearing establishing a mechanical power flow path between the engine and the generator, the method comprising the steps of:
   determining a desired vehicle wheel torque and an engine speed command in response to a driver demand for driving torque;
   determining a generator torque command as a function of the engine speed command;
   determining a motor torque command as a function of the desired vehicle wheel torque and the generator torque command;
   calculating an engine power estimate as a function of desired vehicle wheel torque, motor torque command and generator torque command; and
   filtering the engine power estimate using a weighted filtering factor that is dependent upon motor speed to obtain a final engine power estimate whereby oscillatory torque disturbances in the powertrain are attenuated.

2. The method set forth in claim 1, wherein the step of filtering the engine power estimate comprises developing a non-fluctuating filter variable and modifying an unfiltered component of the engine power estimate whereby an effective attenuated final engine power estimate is developed.

3. The method set forth in claim 2, wherein the step of filtering the engine power estimate includes the step of applying the weighted filtering factor to a filtered component of the filtered engine power estimate.

4. The method set forth in claim 3, wherein the step of filtering the engine power estimate includes the step of applying to the unfiltered engine power estimate component a filtering modifier that is equal to a value of unity less the value of the weighted filtering factor.

5. The method set forth in claim 1, wherein the step of filtering the engine power estimate comprises the step of developing a filtered component of the engine power estimate with a band stop filter having a filter time lag characteristic with respect to an unfiltered component of the engine power estimate.

6. A method for attenuating dynamic oscillatory inertia torque disturbances in a powertrain for a hybrid electric vehicle, the powertrain having a first power source comprising an engine, a second power source comprising an electric motor electrically coupled to a battery and a generator, and gearing establishing a mechanical power flow path between the engine and the generator, the method comprising the steps of:
   determining a desired vehicle wheel torque and an engine speed command in response to a driver demand for driving torque;
   determining generator torque command as a function of the engine speed command;
   determining a motor torque command as a function of the wheel torque command desired and the generator torque command;
   determining motor speed;
   determining generator speed;
   calculating an engine power estimate as a function of the desired vehicle wheel torque, the motor torque command, the generator torque command, the motor speed and the generator speed; and
   filtering the engine power estimate using a weighted filtering factor that is dependent upon motor speed to obtain a final engine power estimate, whereby oscillatory torque disturbances in the powertrain are attenuated.

7. The method set forth in claim 6, wherein the step of filtering the engine power estimate comprises developing a non-fluctuating filter variable and modifying an unfiltered component of the engine power estimate whereby an effective attenuated final engine power estimate is developed.

8. The method set forth in claim 7, wherein the step of filtering the engine power estimate includes the step of applying the weighted filtering factor to a filtered component of the engine power estimate.

9. The method set forth in claim 8, wherein the step of filtering the engine power estimate includes the step of applying to the unfiltered engine power estimate component a filtering modifier that is equal to a value of unity less the weighted filtering factor.

10. The method set forth in claim 6, wherein the step of filtering the engine power estimate comprises the step of developing a filtered component of the engine power estimate with a band stop filter having a time lag characteristic with respect to an unfiltered component of the engine power estimate.

11. The method set forth in claim 5, wherein the step of filtering the engine power estimate comprises execution of an algorithm defining a functional relationship between an engine power estimate before band stop filtering, an engine power estimate after band stop filtering and a weighted filter factor as follows:

Engine Power Estimate=

$$K_p * P_{eng\_pwr\_bsf} + (1 - K_p) * P_{eng\_pwr\_b4f},$$

where:
   $K_p$=a weighted filtering factor
   $P_{eng\_pwr\_bsf}$=estimated power after band stop filtering
   $P_{eng\_pwr\_b4f}$=estimated power before band stop filtering.

12. The method set forth in claim 6, wherein the step of calculating an engine power estimate comprises execution of an algorithm defining a functional relationship between desired vehicle wheel torque, motor torque command, generator torque command, motor speed and generator speed before filtering as follows:

$$P_{eng\_pwr} = \tau_{wh\_des} \times \frac{\omega_{mot}}{K} - (\tau_{mot} \times \omega_{mot} + \tau_{gen} \times \omega_{gen}),$$

where:
$\tau_{wh\_des}$=desired wheel torque
$\tau_{m\_cmd}$=motor torque command
$\tau_{g\_cmd}$=generator torque command
$\omega_m$=motor speed
$n\omega_g$=generator speed
K=a calibrated constant.

13. The method set forth in claim 6, wherein using a weighted filtering factor comprises executing a power estimate algorithm as follows:

Engine Power Estimate=

$$K_p * P_{eng-pwr-bsf} + (1 - K_p) * P_{eng-pwr-b4f}$$

where:
$K_p$=a weighted filtering factor
$P_{eng\_pwr\_bsf}$=estimated power after band stop filtering
$P_{eng\_pwr\_b4f}$=estimated power before band stop filtering.

* * * * *